United States Patent
Tsirkin et al.

(10) Patent No.: US 9,342,450 B2
(45) Date of Patent: May 17, 2016

(54) ON-DEMAND HYPERVISOR MEMORY MAPPING

(75) Inventors: Michael Tsirkin, Yokneam Yillit (IL); Avi Kivity, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 44 days.

(21) Appl. No.: 13/306,040

(22) Filed: Nov. 29, 2011

(65) Prior Publication Data

US 2013/0138863 A1 May 30, 2013

(51) Int. Cl.
| | |
|---|---|
| G06F 12/00 | (2006.01) |
| G06F 12/02 | (2006.01) |
| G06F 11/14 | (2006.01) |
| G06F 9/50 | (2006.01) |
| G06F 9/455 | (2006.01) |

(52) U.S. Cl.
CPC .......... *G06F 12/0284* (2013.01); *G06F 9/5016* (2013.01); *G06F 11/1484* (2013.01); *G06F 9/45533* (2013.01); *G06F 9/45558* (2013.01); *G06F 2009/4557* (2013.01); *G06F 2212/151* (2013.01)

(58) Field of Classification Search
CPC ............ G06F 11/1484; G06F 9/45558; G06F 9/45533; G06F 2009/4557
See application file for complete search history.

(56) References Cited

U.S. PATENT DOCUMENTS

| | | | | |
|---|---|---|---|---|
| 7,793,279 B1 * | 9/2010 | Le et al. | ......................... | 717/168 |
| 2004/0255267 A1 * | 12/2004 | Meijer | ........................... | 717/106 |
| 2007/0288228 A1 * | 12/2007 | Taillefer et al. | ................. | 703/28 |
| 2008/0109629 A1 * | 5/2008 | Karamcheti et al. | .......... | 711/170 |
| 2008/0168479 A1 * | 7/2008 | Purtell et al. | ................... | 719/328 |
| 2012/0047312 A1 * | 2/2012 | Nathuji et al. | .................... | 711/6 |

OTHER PUBLICATIONS

Sun Microsystems, White Paper, "Memory Management in the Java HotSpotTM Virtual Machine", Apr. 2006, http://java.sun.com/j2se/reference/whitepapers/memorymanagement_whitepaper.pdf, pp. 1-21.
SearchServerVirtualization.com, "Virtual memory management techniques: A beginner's guide", Mar. 30, 2011, http://searchservervirtualization.techtarget.com/tip/Virtual-memory-management-techniq . . . , pp. 1-2.
White Paper, "Understanding Memory Resource Management in VMware ESX Server", Aug. 26, 2009, http://www.wmware.com/files/pdf/perf-vsphere-memory_management.pdf, pp. 1-20.
Prpic, Martin, et al., Red Hat Enterprise Linux 6 Resource Management Guide, "Managing system resources on Red Hat Enterprise Linux 6", May 19, 2011, pp. 1-40.
"Red Hat Enterprise Linux 6 Virtualization Guide, Guide to Virtualization on Red Hat Enterprise Linux 6, Edition 3.2", May 18, 2011, pp. 1-366.

\* cited by examiner

*Primary Examiner* — Charles Rones
*Assistant Examiner* — Tian-Pong Chang
(74) *Attorney, Agent, or Firm* — Lowenstein Sandler LLP (57) ABSTRACT

A mechanism for on-demand hypervisor memory mapping is disclosed. A method of the invention includes trapping an access instruction to a memory location from a virtual machine (VM) managed by a hypervisor of a host machine, determining whether a number of accesses to the memory location by the VM exceeds a threshold, if the number of accesses to the memory location by the VM does not exceed the threshold, then emulating the access instruction to the memory location on behalf of the VM, and if the number of accesses to the memory location by the VM exceeds the threshold, then allocating guest physical memory for the VM associated with the memory location.

17 Claims, 5 Drawing Sheets

ON-DEMAND HYPERVISOR MEMORY MAPPING

TECHNICAL FIELD

The embodiments of the invention relate generally to virtualization systems and, more specifically, relate to a mechanism for on-demand hypervisor memory mapping.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a hypervisor manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The hypervisor virtualizes the underlying hardware of the host machine or emulates hardware devices, making the use of the VM transparent to the VM operating system or the remote client that uses the VM.

The hypervisor is also responsible for maintaining a global memory mapping for each VM that it manages. Virtual memory is a well-known technique used in most general-purpose operating systems, and almost all modern processors have hardware to support it. Virtual memory creates a uniform virtual address space presented to the applications and allows the operating system and hardware to handle the address translation between the virtual address space and the physical address space. This technique no only simplifies the programmer's work, but also adapts the execution environment to support large address spaces, process protection, file mapping, and swapping in modern computer systems.

When running a VM, the hypervisor creates a contiguous addressable memory space for the VM. This memory space has the same properties as the virtual address space presented to the applications by the guest operating system. This allows the hypervisor to run multiple VMs simultaneously while protecting the memory of each VM from being accessed by others. Therefore, from the view of the application running inside the VM, the hypervisor adds an extra level of address translation that maps the VM physical addresses to the host virtual address or host physical addresses (depending on the particular virtualization implementation).

The VM may request to change, add, or remove a memory mapping. However, updating the memory mappings by the hypervisor for a VM is an expensive and inefficient operation. In addition, the number of mappings allowed for a VM at any time is also limited, further constraining the resources of the virtualization system.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for on-demand hypervisor memory mapping. A method of embodiments of the invention includes trapping an access instruction to a memory location from a virtual machine (VM) managed by a hypervisor of a host machine, determining whether a number of accesses to the memory location by the VM exceeds a threshold, if the number of accesses to the memory location by the VM does not exceed the threshold, then emulating the access instruction to the memory location on behalf of the VM, and if the number of accesses to the memory location by the VM exceeds the threshold, then allocating guest physical memory for the VM associated with the memory location.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "trapping", "determining", "emulating", "allocating", or the like, refer to the action and processes of a computer system, or similar electronic computing device, that manipulates and transforms data represented as physical (electronic)

quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a mechanism for on-demand hypervisor memory mapping. The on-demand hypervisor memory mapping of embodiments of the invention is an optimization to the memory management functions performed by the hypervisor. The optimization includes the hypervisor adding a memory mapping requested by a VM only when the numbers of requests to access the mapping exceeds a threshold. Otherwise, the hypervisor emulates the request for the VM without adding the mapping. In addition, embodiments of the invention include the hypervisor removing memory mapping for a VM that have not been accessed during a time interval tracked by a timing mechanism in the hypervisor.

Figure 1:
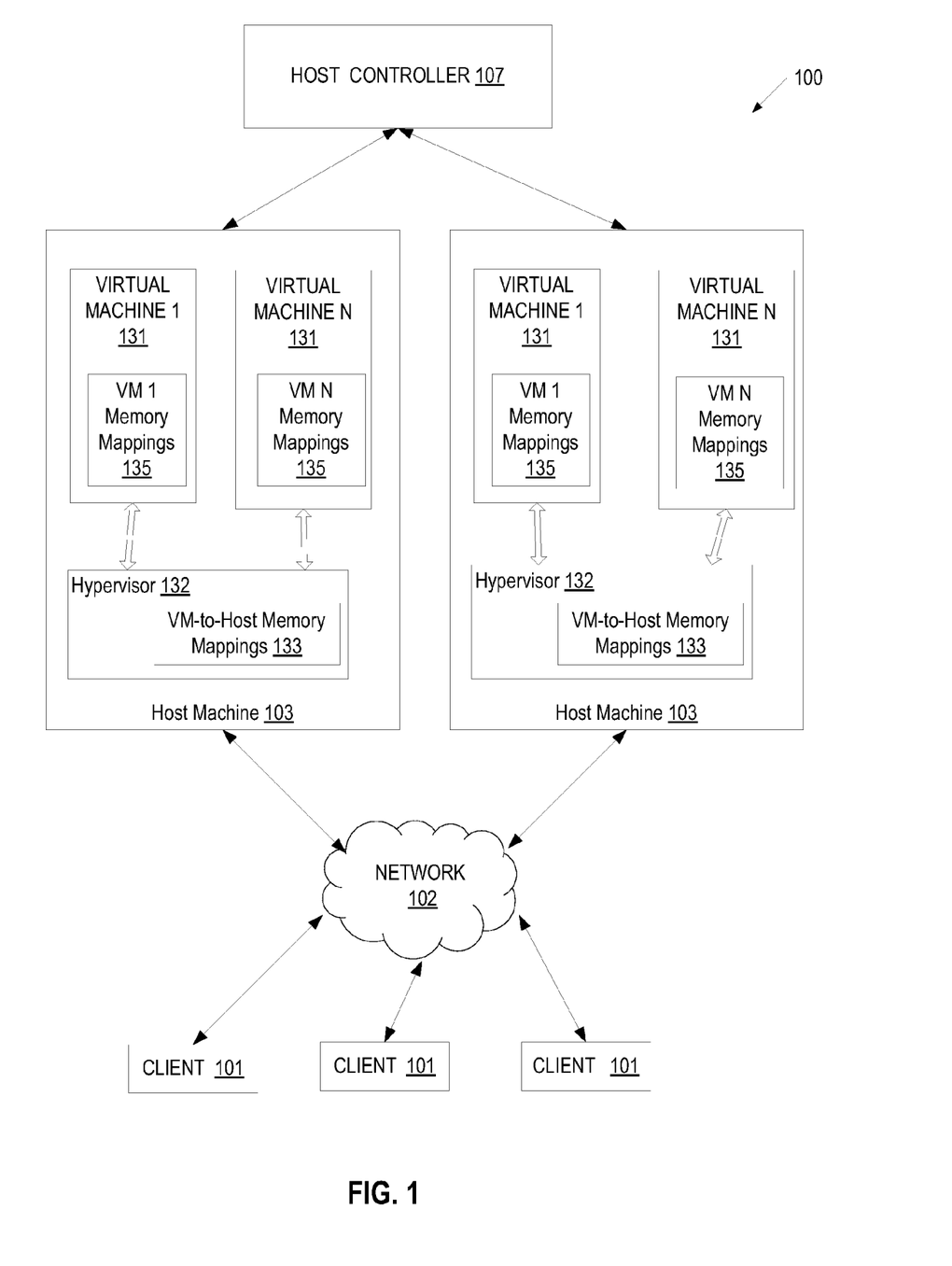
FIG. 1 is a block diagram of an exemplary network architecture in which embodiments of the present invention may operate.

FIG. 1 illustrates an exemplary network architecture 100 in which embodiments of the present invention may operate. The network architecture 100 may include a host machine 103 coupled to one or more clients 101 over a network 102. The network 102 may be a private network (e.g., a local area network (LAN), wide area network (WAN), intranet, etc.) or a public network (e.g., the Internet). In other embodiments, the host machine 103 and clients 101 may be part of the same machine. The host 103 may be coupled to a host controller 107 (via a network or directly). Alternatively, the host controller 107 may be part of the host 103.

In one embodiment, the clients 101 may include computing devices that have a wide range of processing capabilities. Some or all of the clients 101 may be thin clients, which serve as access terminals for users and depend primarily on the host 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications to receive multimedia data streams or other data sent from the host 103 and re-direct the received data to a display or other user interface.

In one embodiment, the host 103 includes a server or a cluster of servers to run one or more VMs 131. Each VM 131 runs a guest operating system (OS) that may be different from one another. The guest OS may include Microsoft Windows, Linux, Solaris, Mac OS, etc. The host 103 also includes a hypervisor 132 that emulates the underlying hardware platform for the VMs 131. The hypervisor 132 may also be known as a VM monitor (VMM), a kernel-based hypervisor or a host operating system.

Each VM 131 can be accessed by one or more of the clients 101 over the network 102. In one scenario, the VM 131 can provide a virtual desktop for the client 101. The VMs 131 can be managed by the host controller 107. The host controller 107 may also add a VM, delete a VM, balance the load on the server cluster, provide directory service to the VMs 131, and perform other management functions.

Embodiments of the invention enable optimization of memory management in the hypervisor 132. The hypervisor 132 creates contiguous addressable memory space 135 for the VMs 131 it manages. This memory mapping space 135 is a virtual memory space that is presented to applications of the VM 131 and allows the guest OS of the VM 131 to handle address translation between the virtual address space of the VM 131 and the physical address space of the VM 131. The hypervisor 132 further creates an extra level of address translation that maps the VM physical addresses of the VM memory mapping 135 to virtual or physical addresses of the host machine 103. This VM-to-host machine mapping is maintained by the hypervisor 132 in a memory mapping data structure 133.

In one embodiment, the hypervisor 132 provides optimized memory management of the VMs' 131 virtual memory in the form of on-demand hypervisor memory mapping. The hypervisor 132 adds memory mappings requested by a VM 131 it manages only when the numbers of requests to access the mapping by the VM 131 exceeds a pre-determined threshold. If the request does not exceed the threshold, then the hypervisor 132 emulates the request for the VM 131 without adding the mapping. In addition, the hypervisor 132 tracks whether memory mappings for a VM 131 have been accessed during a time interval, and if a mapping has not been accesses the hypervisor 132 removes the mapping.

Figure 2:
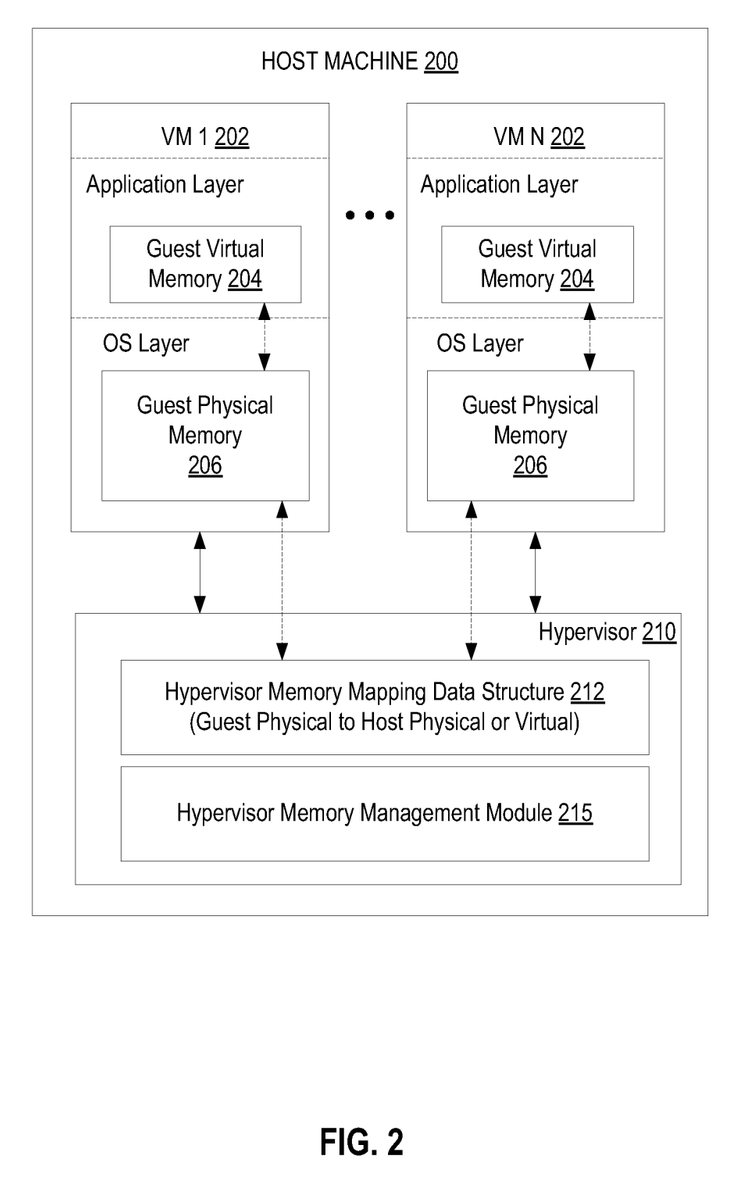
FIG. 2 is a block diagram of a host machine providing on-demand hypervisor memory mapping according to embodiments of the invention.

FIG. 2 is a block diagram of a host machine 200 providing on-demand hypervisor memory mapping according to embodiments of the invention. In one embodiment, host machine 200 is the same as host machine 103 described with respect to FIG. 1. The host machine 200 includes a hypervisor 210 that manages one or more VMs 202. In one embodiment, hypervisor 210 is the same as hypervisor 132 described with respect to FIG. 1. The hypervisor 210 may contain or otherwise control a hypervisor memory mapping structure 212 and a hypervisor memory management module 215.

The hypervisor 210 includes a hypervisor memory management module 215 that creates a contiguous addressable memory space for the VMs 202 it manages. The contiguous address memory space allocated by the hypervisor memory management module 215 to the VM 202 is visible to the OS of the VM 202 and is considered the guest physical memory 206. The guest physical memory 206 is further presented by the VM 202 OS to applications of the VM 202 as continuous virtual address space known as guest virtual memory 204. This allows the VM 202 OS to handle address translation between the guest virtual memory 204 and the guest physical memory 206.

The guest physical memory 206 is backed by the host machine's virtual or physical memory (depending on the particular virtualization implementation), which means the hypervisor 210 provides the mapping from the VM to the host memory. In one embodiment, the hypervisor memory management module 215 provides this VM-to-host memory mapping using the hypervisor memory mapping data structure 212. Memory transfer between the guest physical memory 206 and guest virtual memory 204 is driven by the OS of the VM 202, while memory transfer between the guest physical memory 206 and the host machine is driven by the hypervisor 210.

When a VM 202 first starts, it has no pre-allocated guest physical memory 206. The VM 202 cannot explicitly allocate host memory through any standard interfaces, so must rely on the hypervisor 210 for this purpose. The hypervisor memory management module 215 creates the definitions of "allocated" or "free" guest physical memory 206 for a VM 202 in its own hypervisor memory mapping data structure 212. The hypervisor 210 is responsible for intercepting VM 202 memory accesses and allocating host memory for the VM 202.

In one embodiment, on a VM's 202 first memory access, the hypervisor memory management module 215 traps this memory access request and creates a record of it. However, the hypervisor memory management module 215 does not add the requested mapping to the hypervisor memory mapping structure 212 at this point. Instead, the hypervisor 210 emulates the memory access for the VM 202 and then returns control back to the VM 202. In some embodiments, the emulation by the hypervisor 210 may involve determining the host memory the instruction meant to access, fetching the data from the host memory, and performing the function of the instruction utilizing the fetched data on behalf of the VM 202.

When the VM 202 tries to access the mapping again, the hypervisor memory management module 215 again traps the access and records it. If this is not the first memory access and the mapping is not in hypervisor memory mapping structure 212, the hypervisor 210 also determines whether the number of accesses to this mapping by the VM 202 exceeds a pre-determined threshold value. If not, then the hypervisor memory management module 215 emulates the access for the VM 202 again. On the other hand, if the access does exceed the threshold, then the hypervisor memory management module 215 adds the mapping to hypervisor memory mapping structure 212 and returns control to the VM 202 in order to let the VM 202 perform the access without any emulation done by the hypervisor 210.

In some embodiments, the VM 202 may issue a change or removal request for a mapping that has not yet been added because the number of accesses to the mapping by the VM 202 have not exceeded the threshold. In this case, the hypervisor memory management module 215 does not have to perform any mapping management because the mapping does not exist in the hypervisor memory mapping structure 212 yet. On the other hand, if the mapping associated with the change or removal request has been mapped to structure 212, then this memory mapping change or removal is performed immediately as these memory updates should not be delayed.

In some embodiments, the hypervisor memory management module 215 may track each of its mappings in structure 212 to determine whether any mappings should be removed from the structure 212. Hypervisor memory management module 215 may utilize one or more timers to determine whether any mappings have been accessed during a predetermined time interval. If a time interval expires and the hypervisor memory management module 215 determines that a mapping was not accessed, then the hypervisor memory management module 215 removes this mapping from structure 212.

For example, in one embodiment, each memory mapping in structure 212 may have a flag associated with it and at the beginning of the time interval tracked by a timer of the hypervisor 210 all flags are cleared (or set). Then, when any mappings are accessed, the hypervisor memory management module 215 sets (or clears) the flag for that particular mapping. When the timer expires, the hyper visor memory management module 215 determines which flags are still cleared (or set) and removes those mappings from structure 212.

Figure 3:
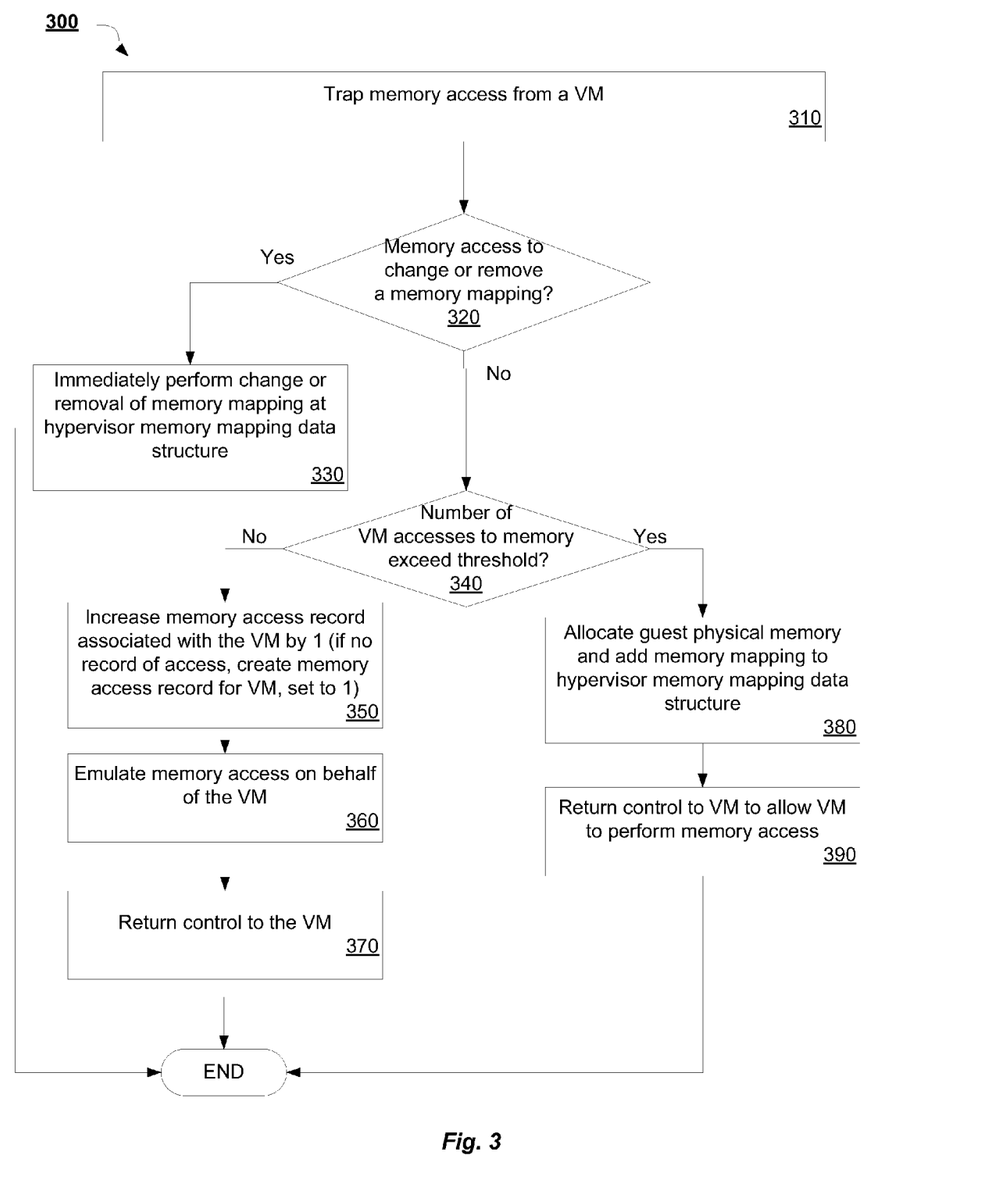
FIG. 3 is a flow diagram illustrating a method for on-demand hypervisor memory mapping to economically add memory mappings according to an embodiment of the invention.

FIG. 3 is a flow diagram illustrating a method 300 for on-demand hypervisor memory mapping to economically add memory mappings according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by hypervisor 132 of FIG. 1 and/or hypervisor memory management module 215 of FIG. 2.

Method 300 begins at block 310 where a memory access is trapped from a VM. Then, at decision block 320, it is determined whether the memory access is to change or remove a memory mapping. If so, then at block 330, the change or removal is immediately performed by the hypervisor with respect to the hypervisor memory mapping data structure. Then, method 300 ends.

If, at decision block 320, the memory access is not to change or remove a memory mapping, the method 300 proceeds to decision block 340, where it is determined whether the number whether the number of accesses by the VM to memory reference din the access exceeds a threshold. In one embodiment, this threshold is configurable by an administrator of the hypervisor or VM. In another embodiment, the number of VM accesses may be stored in hypervisor memory.

If the number of VM accesses to the memory does not exceed the threshold at decision block 340, then method 300 continues to block 350 where a memory access record associated with the VM is increased by 1. In one embodiment, if a memory access record does not exist for the VM (e.g., first memory access by the VM), then this record is created by the hypervisor and initialized to 1. Then, at block 360, the requested memory access is emulated by the hypervisor on behalf of the VM. Subsequently, at block 370, processing control is returned to the VM by the hypervisor. Then, method 300 ends.

If, at decision block 340, the number of VM access to the memory does exceed the threshold, the method 300 proceeds to block 380. At block 380, the guest physical memory for the VM is allocated for the requested memory access. In addition, the memory mapping is added to the hypervisor memory mapping data structure. The, at block 390, control is returned to the VM in order to allow the VM to perform the memory access itself using its allocated guest physical and virtual memory. The, method 300 ends.

Figure 4:
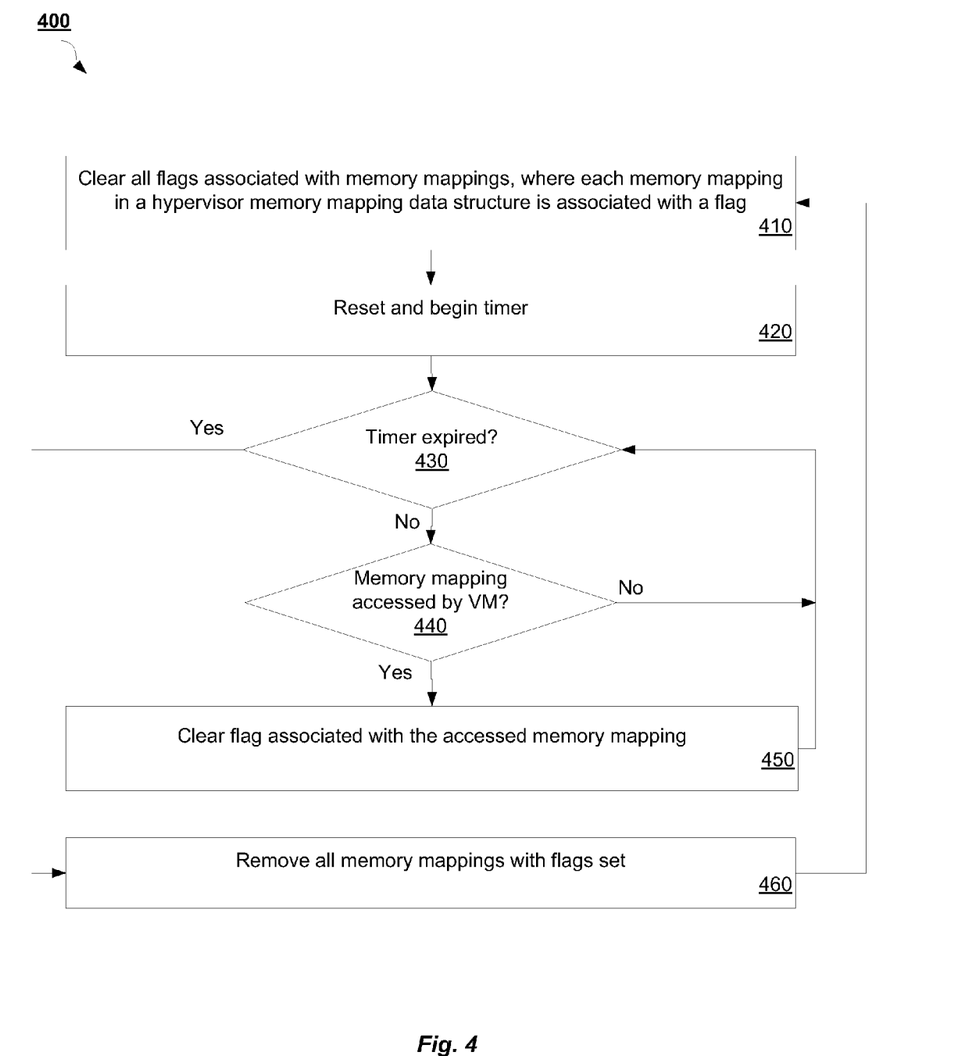
FIG. 4 is a flow diagram illustrating a method for on-demand hypervisor memory mapping to reduce memory mappings according to an embodiment of the invention.

FIG. 4 is a flow diagram illustrating a method 400 for on-demand hypervisor memory mapping to reduce memory mappings according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by hypervisor 132 of FIG. 1 and/or hypervisor memory management module 215 of FIG. 2.

Method 400 begins at block 410 where all flags associated with memory mappings maintained by a hypervisor are cleared. In one embodiment, these flags are stored with each memory mapping of a hypervisor memory mapping data structure. Then, at block 420 a timer is reset and started. In one embodiment, the timer may be set to count down from a pre-determined time that is configurable by an administrator of the hypervisor and host machine.

Then, at decision block 430, it is determined whether the timer has expired. If so, method 400 proceeds to block 460, which is described in further detail below. If the time has not expired, then method 400 proceeds to decision block 440, where it is determined whether a memory mapping is accessed by the VM. In one embodiment, the hypervisor traps any VM accesses to a memory mapping, and utilizes this trap to determine whether particular memory mappings are accessed. If there have been no memory accesses, then method 400 returns to decision block 430 to continue checking the timer for expiration.

If a VM has accessed a memory access at decision block 440, then method 400 continues to block 450 where the flag associated with the accessed memory mapping is cleared. The method 400 returns to decision blocks 430 and 440 to iteratively check the timer for expiration and memory mapping accesses until the time has expired.

When the time has expired at decision block 430, then method 400 proceeds to block 460, where all memory mapping with their flags set in the hypervisor memory mapping data structure are removed. Then, method 400 may return to block 410 to start method 400 over from the beginning. In this way, hypervisor may keep memory mappings that are not being utilized to a minimum, saving resources of the virtualization system.

Figure 5:
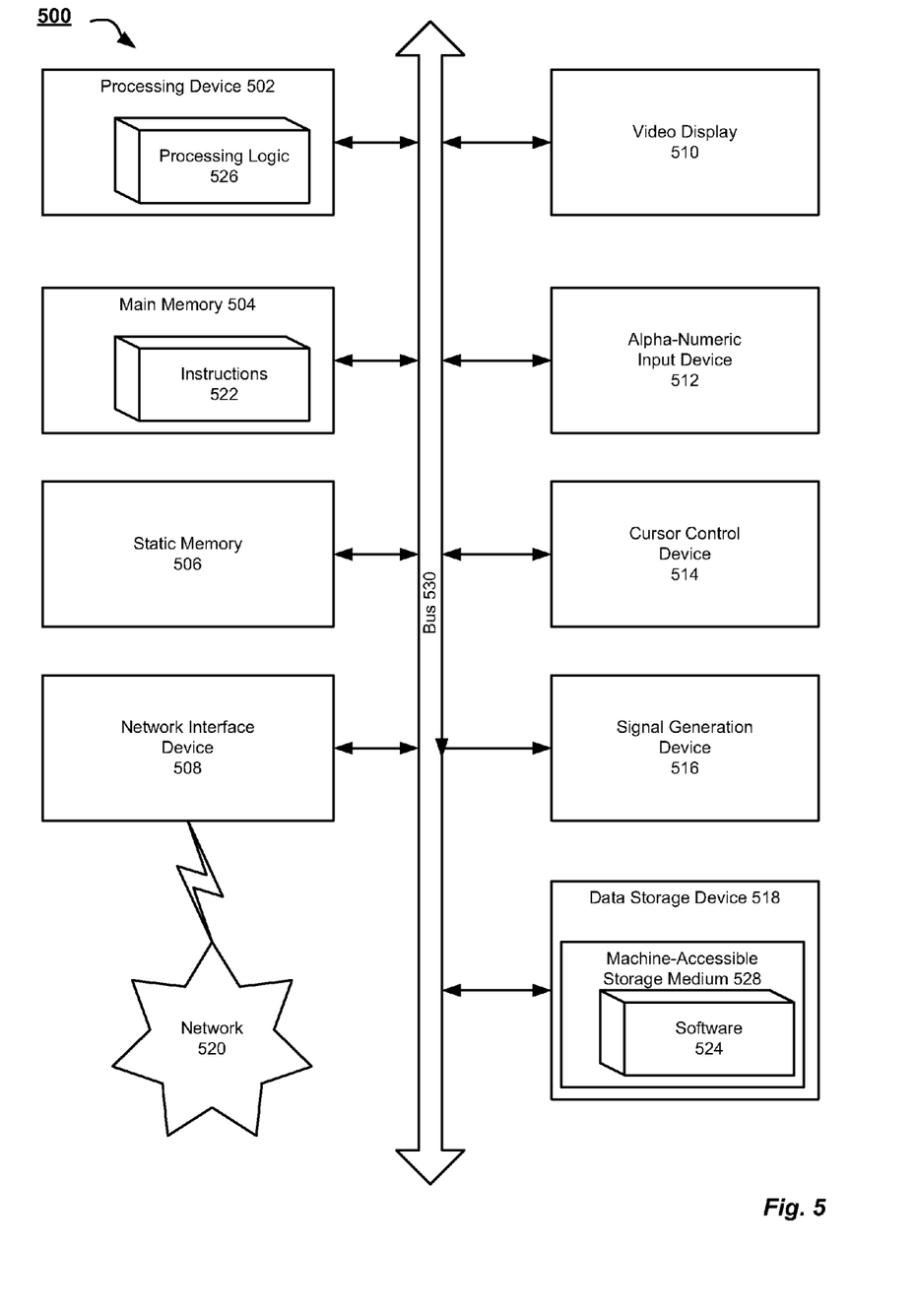
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored software 524 embodying any one or more of the methodologies of functions described herein. For example, software 524 may store instructions to perform a mechanism for on-demand hypervisor memory mapping by hypervisor 132 described with respect to FIG. 1. The software 524 may also reside, completely or at least partially, within the main memory 504 and/or within the processing device 502 during execution thereof by the computer system 500; the main memory 504 and the processing device 502 also constituting machine-accessible storage media.

The machine-readable storage medium 528 may also be used to store instructions to perform methods 300 and 400 for on-demand hypervisor memory mapping described with respect to FIGS. 3 and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    trapping, by a processing device executing a hypervisor of a host machine, an access instruction to a memory location, the access instruction issued from a virtual machine (VM) of a plurality of VMs executed by the host machine and managed by the hypervisor;
    monitoring, by the hypervisor for each of the plurality of VMs, a number of accesses to the memory location per each VM during runtime of each VM;
    maintaining, by the hypervisor, the number of accesses to the memory location by the VM in a memory access record for the memory location, the memory access record corresponding to the VM;
    determining, by the hypervisor, whether the number of accesses maintained in the memory access record for the memory location and the VM exceeds a threshold;
    in response to the number of accesses to the memory location by the VM exceeding the threshold during the runtime of the VM, allocating, by the hypervisor during the runtime of the VM, guest physical memory for the VM to correspond to the memory location;
    in response to the number of accesses to the memory location by the VM being less than or equal to the threshold during the runtime of the VM, emulating, by the hypervisor during the runtime of the VM, the access instruction to the memory location on behalf of the VM without allocating the guest physical memory; and
    removing, by the processing device via the hypervisor during the runtime of the VM, memory mappings for the VM that have not been accessed by the VM during a time interval of the runtime of the VM, wherein removing the memory mappings comprises:
        setting all flags in a memory mapping data structure of the hypervisor, wherein each memory mapping in the memory mapping data structure is associated with a flag;
        resetting a timer of the hypervisor after the timer expires;
        starting the timer;
        clearing any flag associated with a memory mapping that is accessed by a VM managed by the hypervisor; and
        removing the memory mappings in the memory mapping data structure with flags set when the time interval of the timer expires.

2. The method of claim 1, further comprising in response to the number of accesses to the memory location by the VM being less than or equal to the threshold, increasing the memory access record corresponding to both of the VM and the memory location by one.

3. The method of claim 2, wherein in response to the memory access record corresponding to both of the VM and the memory location not existing, creating the memory access record corresponding to both of the VM and the memory location and setting the memory access record to one.

4. The method of claim 1, further comprising returning control to the VM after allocating the guest physical memory, the returning control to allow the VM to perform the access instruction to the memory location.

5. The method of claim 1, wherein in response to the access instruction to the memory location being for at least one of a change or a removal of a memory mapping for the memory location, immediately performing the access instruction to at least one of change or remove the memory mapping at a data structure of the hypervisor.

6. The method of claim 1, wherein the hypervisor maps guest physical memory to corresponding virtual memory of the host machine.

7. The method of claim 1, wherein emulating the access instruction further comprises executing, by the hypervisor, the access instruction without mapping the access and returning control to the VM.

8. A system, comprising:
    a memory; and
    a processing device communicably coupled to the memory, the processing device executing a hypervisor to virtualize the memory and the processing device for one or more virtual machines (VMs) and to:
        trap an access instruction to a memory location, the access instruction issued from a VM of the one or more VMs;
        monitor, for each of the plurality of VMs, a number of accesses to the memory location per each VM during runtime of each VM;
        maintain the number of accesses to the memory location by the VM in a memory access record for the memory location, the memory access record corresponding to the VM;
        determine whether the number of accesses maintained in the memory access record for the memory location and the VM exceeds a threshold;
        in response to the number of accesses to the memory location by the VM exceeding the threshold during the runtime of the VM, allocate, during the runtime of the VM, guest physical memory for the VM to correspond to the memory location;
        in response to the number of accesses to the memory location by the VM being less than or equal to the threshold during the runtime of the VM, emulate, during the runtime of the VM, the access instruction to the memory location on behalf of the VM without allocating the guest physical memory; and
        remove, during the runtime of the VM, memory mappings for the VM that have not been accessed by the VM during a time interval of the runtime of the VM, wherein the hypervisor to remove the memory mappings comprises the hypervisor further to:
            set all flags in a memory mapping data structure of the hypervisor, wherein each memory mapping in the memory mapping data structure is associated with a flag;
            reset a timer of the hypervisor after the timer expires;
            start the timer;
            clear any flag associated with a memory mapping that is accessed by a VM managed by the hypervisor; and
            remove the memory mappings in the memory mapping data structure with flags set when the time interval of the timer expires.

9. The system of claim 8, wherein the hypervisor is further to, in response to the number of accesses to the memory location by the VM not exceeding the threshold, increase the memory access record corresponding to both of the VM and the memory location by one.

10. The system of claim 9, wherein the hypervisor is further to, in response to the memory access record corresponding to both of the VM and the memory location not existing, create the memory access record corresponding to both of the VM and the memory location and setting the memory access record to one.

11. The system of claim 8, wherein the hypervisor is further to return control to the VM after allocating the guest physical memory, the returning control to allow the VM to perform the access instruction to the memory location.

12. The system of claim 8, wherein the hypervisor is further to, in response to the access instruction to the memory location being for at least one of change or a removal of a memory mapping for the memory location, immediately perform the access instruction to at least one of change or remove the memory mapping at a data structure of the hypervisor.

13. The system of claim 8, wherein the hypervisor is further to map guest physical memory to corresponding virtual memory of the host machine.

14. A non-transitory machine-readable storage medium including instructions that, when accessed by a processing device, cause the processing device to:
- trap, by a hypervisor executed by the processing device of a host machine, an access instruction to a memory location, the access instruction issued from a virtual machine (VM) of a plurality of VMs executed by the host machine and managed by the hypervisor;
- monitor, by the hypervisor for each of the plurality of VMs, a number of accesses to the memory location per each VM during runtime of each VM;
- maintain, by the hypervisor, the number of accesses to the memory location by the VM in a memory access record for the memory location, the memory access record corresponding to the VM;
- determine, by the hypervisor, whether the number of accesses maintained in the memory access record for the memory location and the VM exceeds a threshold;
- in response to the number of accesses to the memory location by the VM exceeding the threshold during the runtime of the VM, allocate, by the hypervisor during the runtime of the VM, guest physical memory for the VM to correspond to the memory location;
- in response to the number of accesses to the memory location by the VM being less than or equal to the threshold during the runtime of the VM, emulate, by the hypervisor during the runtime of the VM, the access instruction to the memory location on behalf of the VM without allocating the guest physical memory; and
- remove, by the hypervisor during the runtime of the VM, memory mappings for the VM that have not been accessed by the VM during a time interval of the runtime of the VM, wherein removing the memory mappings comprises the processing device further to:
  - set all flags in a memory mapping data structure of the hypervisor, wherein each memory mapping in the memory mapping data structure is associated with a flag;
  - reset a timer of the hypervisor after the timer expires;
  - start the timer;
  - clear any flag associated with a memory mapping that is accessed by a VM managed by the hypervisor; and
  - remove the memory mappings in the memory mapping data structure with flags set when the time interval of the timer expires.

15. The non-transitory machine-readable storage medium of claim 14, wherein the processing device is further to, in response to the number of accesses to the memory location by the VM not exceeding the threshold, increase the memory access record corresponding to both of the VM and the memory location by one.

16. The non-transitory machine-readable storage medium of claim 15, wherein the processing device is further to, in response to the memory access record corresponding to both of the VM and the memory location not existing, create the memory access record corresponding to both of the VM and the memory location and setting the memory access record to one.

17. The non-transitory machine-readable storage medium of claim 14, wherein the time is set to a pre-determined time that is configured by an administrator of the hypervisor.

* * * * *